April 10, 1951 M. R. HUTCHISON, JR 2,548,534

REEL SPINDLE

Filed Dec. 26, 1947

MILLER R. HUTCHISON JR
INVENTOR

BY [signature] [signature]
ATTORNEYS

Patented Apr. 10, 1951

2,548,534

UNITED STATES PATENT OFFICE 2,548,534

REEL SPINDLE

Miller R. Hutchison, Jr., Rochester, N. Y., assignor to Eastman Kodak Company, Rochester, N. Y., a corporation of New Jersey Application December 26, 1947, Serial No. 793,888

20 Claims. (Cl. 242—70)

The present invention relates to a spindle for supporting and driving a film reel during projection and winding of motion picture film.

Reels in common use differ widely in dimensional characteristics. For example, those used for 16-mm. film range in diameter from a few inches to one and one quarter feet; in flange thickness from 0.027 to 0.066 inch; in overall length from 0.699 to 0.807 inch; and in hub opening shape from a combination of round and square orifices in separate flanges to identical ones of square form elaborated with slots, up to three in number, extending in various directions.

The film spindle must accommodate all kinds of film reels; furnish adequate support for reels weighing up to seven pounds, including film; accurately position the film to protect its edges; function satisfactorily at speeds up to 350 revolutions per minute; occupy as little space as possible to further compactness of design; and be operable quickly and easily, often in total darkness, for the convenience of the operator.

Spindles commonly used effect the fastening of the film reel by means of hairpin-shaped springs, spring latches or turndown tabs. None of these possesses the versatility of the present invention in accommodating the wide dimensional variations in reels without permitting wobble and end play which affect support, position and life of the film; nor provides greater compactness without sacrifice of bearing area; nor is more readily operated.

The principal object of the present invention is to provide a film reel spindle which positions the reel independently of variations in flange thickness, hub openings and overall length; and prevents wobble and end play.

A further object of the invention is the provision of a quick-acting, positive fastening for a film reel on a reel spindle.

Another object of the invention is the provision of symmetry of bearing area with respect to the applied loads in a film reel spindle.

A still further object of my invention is to provide a compact design in a film reel spindle carried upon an arm.

To these and other ends which will be apparent, I provide a film reel spindle of tubular form journaled throughout substantially its entire length upon a fixed shaft. The latter is supported at its inner end by a reel arm forming part of the projection and winding apparatus, and provides shoulders limiting the end play of the spindle to a very small amount. The spindle is secured at its inner end, adjacent the reel arm, to a disc forming part of a detent mechanism. At its middle it is enlarged locally to form a square portion of which the sides are tangent to its periphery and the inner end forms an abutment for the film reel. Its outer end is knurled for manual engagement during locking and unlocking. Between abutment and disc, a collar or pulley is journaled and free to move axially under spring pressure directed toward the abutment by the detent mechanism. The outer face of the pulley carries a short, square projection of the same shape as the spindle abutment and is adapted to fit the square opening in the reel flange. The detent mechanism consists of three spring-pressed plungers housed within equidistantly spaced, parallel bores within the pulley body, the plungers being in engagement with the spindle disc. The latter provides three slots in its outer face adapted to the plungers so as to limit the angular excursion of the pulley to one-eighth of a turn, or 45°, about the spindle; and pairs of depressions, located at the ends of the slots, into which the plungers fall at the extremes of pulley position, providing frictional latching of the spindle in locked and unlocked positions, respectively.

The spindle is unlocked when the pulley projection aligns with the spindle abutment. A film reel may then be placed upon the spindle, slide along it until its inner face rests against the pulley face and is pressed against that face to compress the springs in the pulley. Locking is accomplished by rotating the spindle clockwise, until stopped by the detent, while the springs are compressed and the reel is prevented from turning. This brings about the mismating of the spindle abutment and the square opening in the reel flange. Upon letting go of the reel, it is pressed against the abutment by the springs in the pulley. Being clamped in this fashion between pulley and abutment, two surfaces at right angles to the spindle axis, the reel flange cannot wobble or move endwise. The resilience of the springs permits reel flanges of different thicknesses to be accommodated equally well without effect upon the axial location of the film; the abutment is the locating means and positions a face of the film reel against which the film rests when stored on the reel. It is unimportant in this respect that film reels vary in overall (axial) length, the spindle being more than long enough to support the outer flange of the reel. Power is applied to the reel, when necessary, through its hub engagement with the pulley. The spindle and detent mechanism take no part in the driving and are relieved of such stress.

The film reel may be removed from the spindle by unlocking the latter. This is done easily by holding the reel against rotation while the spindle is turned counterclockwise until stopped by the detent. This brings the abutment into alignment with the square opening in the reel flange which may then be slid off the spindle.

It is evident that my invention provides a bearing extending throughout the spindle, well adapted to sustain all applied loads from belt drive, weight of film, centrifugal force of unbalanced reels, and film tension.

It is also evident that the present invention, by its telescopic construction and its prevention of reel wobble, makes possible a very compact design of reel arm and film reel spindle.

The invention resides in certain improvements and combinations of parts, all as fully described hereinafter, the novel features being delineated in the claims appended to the specification.

Figures 1, 2, 3, 4:
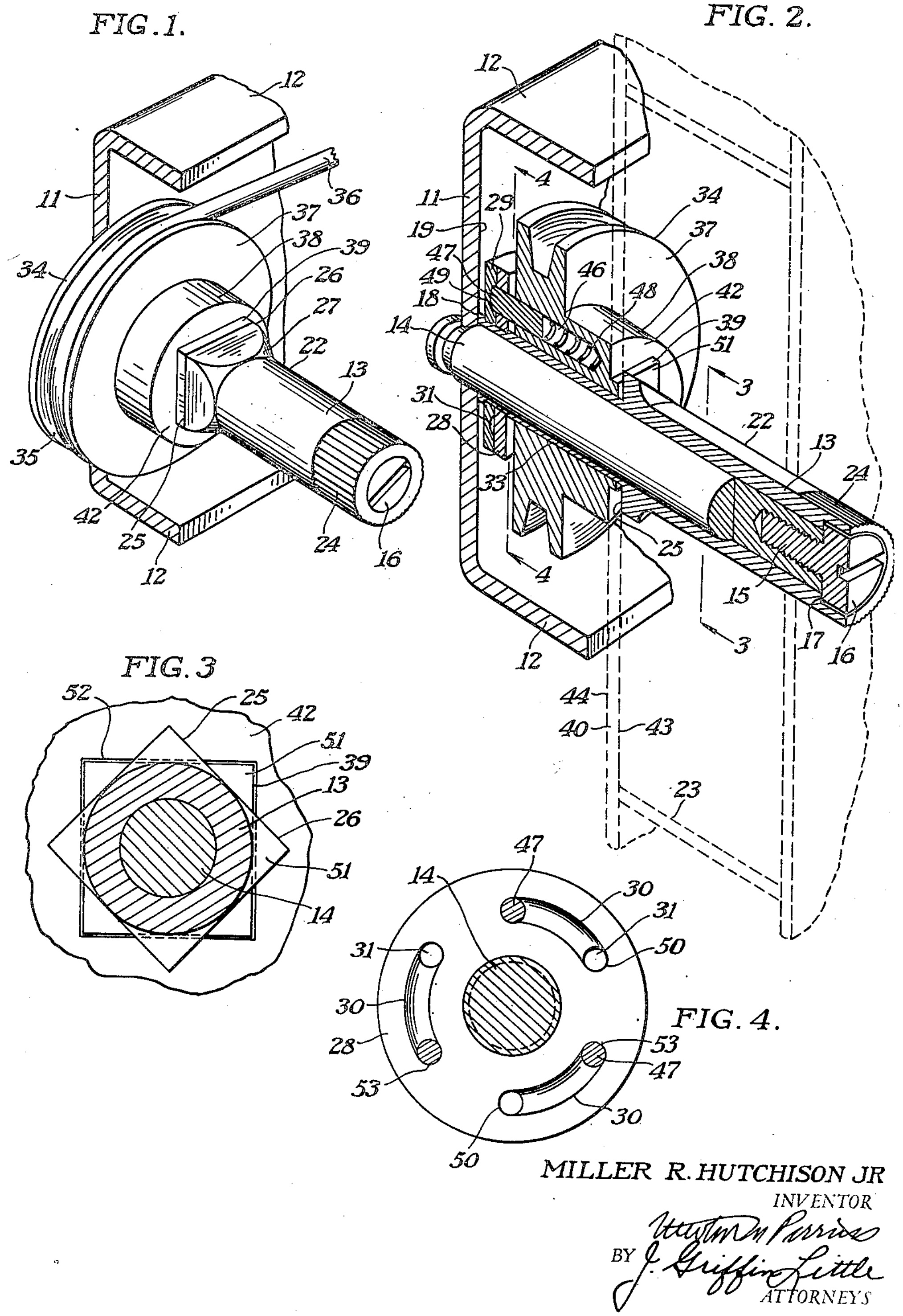
Fig. 1 is a perspective view of a film reel spindle and pulley mechanism constructed in accordance with the present invention, showing its relation to the reel arm.
Fig. 2 is a view similar to Fig. 1, but with the spindle parts in vertical section, showing the relation of the spindle and pulley parts.

Fig. 3 is a part-sectioned end view taken substantially one line 3—3 of Fig. 2, showing the relation between spindle, pulley and reel hub in operative position; and Fig. 4 is an end view of the detent plate forming part of the spindle, showing the slots limiting the travel of the spring-pressed plungers in the pulley, and the depressions at the ends of the slots providing frictional latching between spindle and pulley.

Similar reference numerals throughout the views indicate the same parts.

The reel arm of the present invention may be of any suitable design as it does not constitute a part of the invention. In the specific embodiment shown in the drawings, this support takes the form of a channel-shaped arm having a web 11 and flanges 12. A film reel spindle 13 is journaled on a fixed stub shaft 14 one end of which is anchored in the web 11 in any suitable and well known manner. A screw 15 engages a threaded hole in the outer end of the shaft 14 against which the screw head 16 is seated. The spindle 13 is positioned endwise, free to turn, between the screw head 16 and the web 11 with minimum end play. One end of the spindle has a counterbore 17 to house the screw head. A thrust washer 18 may be placed between the spindle and the web, if desired.

The reel-supporting portion 22 of the spindle 13 is cylindrical in shape and extends through the film reel 23 of familiar construction, indicated by dotted lines in Fig. 2. The portion 22 is of a length greater than the reel to provide a projecting gripping section 24, for a purpose to be described later. Intermediate of the ends, the spindle 13 is enlarged to form a square portion of which the sides 26 are tangent to the periphery 22. The square portion is faired into the cylindrical portion by the surfaces 27 at its outer end and forms a radial abutment 25 at its inner end. The inner end of the spindle, adjacent the web 11, bears a disc abutment which, in the preferred form, comprises a pair of plates 28 and 29 joined together to form, in effect, a single plate fastened to the spindle in any suitable manner. The front plate 28 has formed therein three arcuate slots 30 while the rear plate 29 is provided with three pairs of recesses, or depressions, 31 located so that a recess is at each end of every slot, as indicated in Fig. 4. The purpose of this arrangement will be clarified presently.

That portion of the spindle 13 lying between the disc abutment 28 and the shoulder abutment 25 is preferably, although not necessarily, of slightly smaller diameter than the portion 22 and has journaled upon it a pulley 34 which is free to move endwise between the abutments. The pulley has a cylindrical hub 38, and a peripheral groove 35 adapted to receive a driving belt 36 from the machine, not shown. Thus, when the belt is driven, the pulley 34 will be rotated. The pulley hub 38 terminates in a square portion 39 of the same contour as the spindle abutment 25 and adapted to fit into a similarly shaped hole 52 in the inside flange 40 of the film reel 23. The square portion 39 is made shorter than the thickness of thinnest reel flange to be supported and driven by it. The film reel 40 is not detailed as it may be of any well known construction and such details are unnecessary to a full and complete understanding of the present invention. The pulley is provided with a plurality, preferably three, of bores 46 equidistantly spaced about and parallel to the spindle axis. In each a plunger 47 is guided and a coil spring 48 is housed, so as to press the plunger against the spindle disc abutment plate 29 and the pulley toward the spindle abutment 25. The end 49 of each plunger 47 extends through a slot 30 of detent plate 28 and is limited thereby to an excursion of 45 degrees about the spindle. This, in turn, limits the angular movement of the pulley. At each end of all slots, plunger ends 49 fall into registered depressions 31 of abutment plate 29 under pressure from springs 48 whereby frictional latching of the parts is effected.

When a film reel is to be placed upon the spindle, the parts of the reel spindle occupy the positions shown in Fig. 1, the square portions 39 and 26 of the pulley and spindle, respectively, being in register, or mating, with one another. At this time, Fig. 4 shows that the ends 49 of the plungers 47 will be restrained against counter-clockwise movement by the left ends 53 of slots 30 in detent plate 28; and will engage the corresponding depressions 31 in abutment plate 29 for frictional latching. The film reel, properly oriented, is threaded over the spindle with flange 40 first, or to the left as viewed in Figs. 1 and 2. In the event that the flange opening 52 is not in alignment angularly with the square portion 26 of the spindle, the latter may be rotated as a unit, including the pulley, by means of the gripping section 24 while the reel is held stationary by the hand. This may be done entirely by feel and as readily in the dark as the light. Then, the flange 40 of the reel 23 may be brought into contact with the pulley, its face 44 contacting the face 42 thereof while its hub opening 52 embraces the pulley projection 39. The reel is then pushed against the pulley which yields axially as the springs 48 are compressed. When the inner face 43 of the film reel has reached or passed beyond the plane of the spindle abutment 25, the spindle may be turned in a clockwise direction by means of the gripping section 24 while the reel is manually prevented from turning. The reel prevents rotation of the pulley through its engagement of it as aforesaid. The spindle is free to turn through 45 degrees at which point it is arrested by the detent mechanism, plungers 47 then engaging ends 50 of slots 30 in detent plate 28 and depressions 31 in abutment plate 29. This operation does not require visual inspection and may be done as readily in darkness as in the light. The reel is then released by the hand and the pulley and reel move under the action of the springs 48 until the inner face 43 of the reel 23 abuts the spindle abutment 25, now completely out of register with the flange hub opening 52 as shown best by Fig. 3. The opposite face 44 of this reel flange abuts the face 42 of the pulley hub 38. Being clamped or squeezed under spring pressure between two abutments which are square with the spindle axis, the reel flange 40 is positioned squarely on that axis independently of looseness of radial fit between the reel and its supporting means, whereby wobbling is prevented. As the shoulder 25 is fixed axially and always engages the inner face 43 of the reel flange 40, this face and the adjacent edge of the film strip wound on the film reel will be positioned axially in fixed relation to the reel arm 11 and the machine of which it forms a part, independently of variations in flange thickness and overall length of reel. The accurate and consistent positioning of film reels permits more compact design of equipment and prevents scraping of the film against reel flanges and machine surfaces serving to guide the film from and to the reel.

It is evident that accidental removal of the film reel from the spindle cannot occur, even though it may turn at high speed or be stopped suddenly, and the film on the reel is at all times protected from physical damage in the operation of the machine.

To remove a film reel it is necessary to unlock the spindle manually. This is done by returning the parts to the position shown in Fig. 2, grasping the reel to prevent rotation while the gripping section of the spindle is turned with the fingers through 45 degrees in a counterclockwise direction to position the parts as shown in Fig. 1. The detent mechanism stops the motion when the hub squares are in alignment, functioning as described earlier in the reverse direction, and the reel may then be slipped off the spindle without hindrance. As before, this is done by feel and no light is necessary to its quick and easy accomplishment.

In the event that the film reel spindle is to serve solely as a support for film reels not requiring belt drive, as for supply reels only, the groove 35 and the pulley 34 may be omitted, and a knurl put upon the surface 38 extended the length of the piece for convenience in holding this part if it becomes misaligned with the spindle from any cause.

While one embodiment of the invention has been disclosed, it is to be understood that the invention may be carried out in a number of ways. For example, the spindle 13 may be nontubular, or of solid construction, being extended to the left in Figs. 1 and 2 and journaled upon said extension instead of employing the preferred telescopic construction. This application is, therefore, not to be limited to the precise details revealed, but is intended to cover all variations and modifications thereof which fall within the scope of the appended claims.

I claim:

1. In a device of the class described, the combination with a support, of a film-reel spindle rotatably mounted on said support and having a flanged film reel positioned thereon, means carried by said spindle and positionable in an aperture of a flange of said reel to support the latter on said spindle, a pair of axially spaced and relatively adjustable abutments on said spindle adapted to engage opposite faces of said flange to clamp the latter therebetween and on said supporting means, one of said abutments registering with said supporting means, and means for rotating said one abutment to move the latter out of registry with said supporting means to clamp said flange in position between said abutments to lock said reel releasably to said spindle so as to rotate as a unit therewith.

2. In a device of the class described, the combination with a support, of a film-reel spindle rotatably mounted on said support and having a flanged film reel positioned thereon, means carried by said spindle and positionable in an aperture of a flange of said reel to support the latter on said spindle, an axially fixed abutment on said spindle adjacent said supporting means and adapted to be arranged in registry therewith and to engage a surface of said flange to position said reel flange axially on said spindle, a yieldably mounted and axially movable abutment carried by said spindle and adapted to engage another surface of said flange, and means for moving said first abutment out of registry with said supporting means to clamp said flange between said abutments and on said supporting means to lock said reel releasably to said spindle so as to rotate as a unit therewith.

3. In a device of the class described, the combination with a support, of a film-reel spindle rotatably mounted on said support and having a flanged film reel positioned thereon, means carried by said spindle and positionable in an aperture of a flange of said reel to support the latter on said spindle, an axially fixed abutment on said spindle adjacent said supporting means and adapted to be arranged in registry therewith and to engage a surface of said flange to position said reel axially on said spindle, a yieldably mounted and axially movable abutment carried by said spindle and adapted to engage another surface of said flange, means for moving said first abutment out of registry with said supporting means to clamp said flange between said abutments and on said supporting means to lock said reel releasably to said spindle so as to rotate as a unit therewith, and means for limiting the movement of said first abutment.

4. In a device of the class described, the combination with a support, of a film-reel spindle rotatably mounted on said support and having a flanged film reel positioned thereon, means carried by said spindle and positionable in an aperture of a flange of said reel to support the latter on said spindle, an axially fixed radial abutment on said spindle adjacent said supporting means and adapted to be arranged in registry therewith and to engage a surface of said flange to position said flange axially on said spindle, a member journaled on said spindle, means for operatively connecting said member to said spindle for rotation as a unit therewith, a radial abutment on said member adapted to engage another surface of said flange, means for yieldably moving said member axially toward said flange to bring the abutment thereon into engagement with said other surface to position said flange between said abutments and on said supporting means, and means for moving said first abutment out of registry with said supporting means to lock said reel releasably to said spindle for rotation as a unit therewith.

5. In a device of the class described, the combination with a support, of a film-reel spindle rotatably mounted on said support and having a flanged film reel positioned thereon, means carried by said spindle and positionable in an aperture of a flange of said reel to support the latter on said spindle, an axially fixed radial abutment on said spindle adjacent said supporting means and adapted to be arranged in registry therewith and to engage a surface of said flange to position said reel flange axially on said spindle, a member journaled on said spindle, means for operatively connecting said member to said spindle for rotation as a unit therewith, a radial abutment on said member adapted to engage another surface of said flange, means for yieldably moving said member axially toward said flange to bring the abutment thereon into engagement with said other surface to position said flange between said abutments and on said supporting means, means for moving said first abutment out of registry with said supporting means to lock said reel releasably to said spindle, and cooperating means on said spindle and member for limiting the movement of said first abutment to position the latter relative to said supporting means.

6. In a device of the class described, the combination with a support, of a film-reel spindle rotatably mounted on said support and having a flanged film reel positioned thereon, means carried by said spindle and positionable in an aperture of a flange of said reel to support the latter on said spindle, an axially fixed abutment on said spindle adjacent said supporting means and adapted to be arranged in registry therewith and to engage a surface of said flange to position said reel flange axially on said spindle, guide means on said spindle adjacent said abutment for guiding said reel flange onto said supporting means, a member journaled on said spindle, means for yieldably moving said member toward said abutment to bring a surface of said member into contact with another surface of said flange, means for moving said abutment out of registry with said supporting means to clamp said flange between said surface and said abutment and in a definite axial relation to said spindle, means for limiting the movement of said abutment, and means to hold said abutment releasably in adjusted position.

7. In a device of the class described, the combination with a support, of a film-reel spindle rotatably mounted on said support and having a flanged film reel positioned thereon, means carried by said spindle and positionable in an aperture of a flange of said reel to support the latter on said spindle, an axially fixed abutment on said spindle adjacent said supporting means and adapted to be arranged in registry therewith and to engage a surface of said flange to position said reel flange axially on said spindle, a plate member carried by said spindle, a collar journalled on said spindle on the side of said supporting means opposite said abutment, a surface on said collar adapted to engage another surface of said flange and to cooperate with said abutment to clamp said flange therebetween and on said supporting means, spring pressed members carried by said collar and engaging said plate and tending to move said collar and surface toward said abutment and into clamping relation with said flange, means for moving said abutment out of registry with said supporting means to allow said abutment to cooperate with said surface to clamp said flange therebetween, and means for retaining said abutment in non-registering relation.

8. In a device of the class described, the combination with a support, of a film-reel spindle rotatably mounted on said support and having a flanged film reel positioned thereon, means carried by said spindle and positionable in an aperture of a flange of said reel to support the latter on said spindle, an axially fixed rotatable abutment on said spindle positioned adjacent said supporting means and arranged in registry therewith, guide means on said spindle for guiding said flange over said abutment and onto said supporting means, a collar loosely journaled on said spindle on the side of said supporting means opposite said abutment, means to connect said collar in operative relation with said spindle so as to rotate as a unit therewith, a surface on said collar adapted to engage the outer face of said flange, means cooperating with said connecting means to shift said collar yieldably toward said supporting means to position said surface in contact with said outer face, means for rotating said abutment relative to said collar to move the abutment out of registry with said supporting means and into contact with the inner face of said flange to cooperate with said surface to clamp said flange therebetween and with the inner face of the flange in a definite axial relation to said spindle, and means for retaining said abutment in adjusted position.

9. In a device of the class described, the combination with a support, of a film-reel spindle rotatably mounted on said support and having a flanged film reel positioned thereon, means carried by said spindle and positionable in an aperture of a flange of said reel to support the latter on said spindle, a radially extending axially fixed rotatable abutment on said spindle positioned adjacent said supporting means and arranged in registry therewith, guide means on said spindle for guiding said flange over said abutment and onto said supporting means, a collar loosely journaled on said spindle on the side of said supporting means opposite said abutment, said collar having a plurality of spaced axial openings, spring pressed members positioned in said openings, a plate secured to and extending radially from said spindle, said plate having curved slots therein into which said spring pressed members extend, said plate also having a recess adjacent each end of each slot and adapted to receive said spring pressed members, the latter being received in certain of said recesses when said abutment is in registry with said supporting means to retain said registering relation and to connect said collar in operative relation to said spindle so as to rotate as a unit therewith, means for rotating said abutment out of registry with said supporting means to engage an inner face of said flange to position the latter axially relative to said spindle, said spring-pressed members acting on said plate and serving to shift said collar toward said flange to bring a radially extending surface of the collar into engagement with an outer face of said flange so that said flange is held yieldably and square with said spindle between said surface and said abutment and on said supporting means, the rotating of said abutment serving to move said spring-pressed members along said slots and into the recesses adjacent the other ends thereof, the engagement of the pins with the ends of the slots limiting the rotative movement of said abutment, said pins and recesses serving to retain the abutment in its adjusted positions.

10. In a device of the class described, the combination with a support, a shaft mounted in fixed relation to said support, a reel supporting spindle rotatably mounted on said shaft and having a flanged film reel positioned thereon, means for connecting said spindle to said shaft for rotation thereon, a radially extending reel-positioning shoulder formed on said spindle, a reel-supporting portion carried by said spindle adjacent said shoulder and adapted to be positioned in a central opening of a flange of said reel to support the latter on said spindle, said shoulder being positionable in registry with said supporting portion to permit said flange to be positioned thereon, flange guide means on said spindle adjacent said shoulder for guiding said opening into position to receive said supporting portion, a collar journaled on said spindle on the side of said supporting portion opposite said shoulder, a surface of said collar adapted to engage an outer face of said flange, a radially extending plate secured to said spindle and positioned on the side of said collar opposite said surface, means for yieldably moving said collar toward said shoulder to bring said surface into contact with said outer face, pin and slot connections between said plate and collar to connect the latter in operative relation to said spindle so as to rotate as a unit therewith but to permit limited rotative movement of said shoulder relative to said collar, means to rotate said spindle relative to said collar to shift said shoulder out of registry with said supporting means so as to engage an inner face of said flange to position the latter accurately axially on said spindle, said shoulder then cooperating with said surface to clamp said flange to hold the latter in position on said supporting means, and means for limiting relative rotative movement of said shoulder.

11. In a device of the class described, the combination with a support, of a film-reel spindle rotatably mounted on said support and having a flanged film reel positioned thereon, a reel supporting portion carried by said spindle, a pair of axially spaced members carried by said spindle and adapted to engage opposite faces of a flange of said reel to clamp the flange in position on said portion and square with the axis of said spindle, one of said members being fixed axially on said spindle to engage and accurately position said flange axially relative to said spindle, means for yieldably moving said other member toward said fixed member to adjust the spacing between said members to suit reel flanges of different thicknesses.

12. In a device of the class described, the combination with a support, of a film-reel spindle rotatably mounted on said support and having a flange film reel positioned thereon, a reel supporting portion carried by said spindle, a pair of radial axially spaced members carried by said spindle and adapted to engage opposite faces of a flange of said reel to clamp the flange in position on said portion, one of said members being fixed axially on said spindle to engage and accurately position said flange axially relative to said spindle, means for yieldably moving said other member toward said fixed member to adjust the spacing between said members to suit reel flanges of different thicknesses, and means for rotating said members relatively to clamp said reel releasably between said members and on said portion.

13. In a device of the class described, the combination with a support, of a film-reel spindle rotatably mounted on said support and having a flanged film reel positioned thereon, a pair of radially extending axially spaced members carried by said spindle and adapted to engage opposite faces of a flange of said reel, one of said members being axially fixed on said spindle and adapted to engage a face of said flange to position said face accurately axially relative to said spindle, a flange supporting portion carried by the other member, means for moving said other member yieldably toward said fixed member to engage another face of said flange and to cooperate with said fixed member to clamp said flange therebetween, said other member being axially adjustable relative to said fixed member to vary the spacing therebetween to accommodate flanges of different thicknesses.

14. In a device of the class described, the combination with a support, of a film-reel spindle rotatably mounted on said support and having a flanged film reel positioned thereon, a pair of radial axially spaced members carried by said spindle and adapted to engage opposite faces of a flange of said reel, one of said members being axially fixed on said spindle and adapted to engage a face of said flange to position said face accurately axially relative to said spindle, said other member being journaled on said spindle, means for operatively connecting said other member to said spindle so as to rotate as a unit therewith when said other member is rotated, a flange carrying portion formed on said other member adjacent said fixed member, resilient means for moving said other member into engagement with another face of said flange to cooperate with said fixed member to clamp said flange therebetween and on said portion and square with the axis of the spindle, said resilient members permitting axial movement of said other member to vary the spacing between said members to suit flanges of different thicknesses.

15. In a device of the class described, the combination with a support, of a film-reel spindle rotatably mounted on said support and having a flanged film reel positioned thereon, a pair of radial axially spaced members carried by said spindle and adapted to engage opposite faces of a flange of said reel, one of said members being axially fixed on said spindle and adapted to engage a face of said flange to position said face accurately axially relative to said spindle, said other member being journaled on said spindle, means for operatively connecting said other member to said spindle so as to rotate as a unit therewith when said other member is rotated, a flange carrying portion formed on said other member adjacent said fixed member, resilient means for moving said other member into engagement with another face of said flange to cooperate with said fixed member to clamp said flange therebetween and on said portion and square with the spindle, said resilient members permitting axial movement of said other member to vary the spacing between said members to suit flanges of different thicknesses, said fixed member being adapted to be positioned in registry with said carrying portion to permit said flange to be moved into position to be supported on said carrying portion, and means for rotating said axially fixed member to move the latter out of registry with said carrying portion to lock said flange thereon between said members.

16. In a device of the class described, the combination with a support, of a cylindrical film-reel spindle rotatably mounted on said support, a pair of radial axially spaced members carried by said spindle and adapted to engage opposite faces of a reel flange to clamp the latter therebetween, one of said members being axially fixed and projecting axially from said spindle and adapted to engage a face of said flange to position the latter accurately axially on said spindle, a flange supporting portion formed on said other member and of a peripheral shape identical to that of said fixed member so that when the latter is in registry with said portion the reel may be slid over said spindle and the flange positioned and supported on said portion, means for moving said other member yieldably toward said fixed member so as to engage another face of said flange and to cooperate with said fixed member to clamp said flange therebetween, a guiding surface on said spindle adjacent said fixed member to guide said flange onto said portion when the latter and said fixed member are in registry, means for rotating said fixed member relative to said portion so as to be moved out of registry therewith to bring said fixed member into engagement with said one face to position the latter axially and to cooperate with the other member to clamp said flange, means for limiting the rotative movement of said fixed member, and means for releasably retaining said fixed member in adjusted position.

17. In a device of the class described, the combination with a support, of a cylindrical film-reel spindle rotatably mounted on said support and having a flanged film reel positioned thereon, a radially projecting axially fixed shoulder formed on said spindle intermediate the ends thereof, a laterally projecting plate carried by said spindle and axially spaced from said shoulder, a collar journaled on said spindle between said shoulder and said plate, spring-pressed members carried by said collar and engaging said plate to move said collar toward said shoulder to bring a radial surface on said collar into engagement with an outer face of a flange of said reel, a supporting portion projecting axially from said surface toward said shoulder and adapted to be positioned in a similarly shaped aperture on said flange to support the latter on said collar, said shoulder and portion having similarly shaped peripheries so that when in registry the flange may be moved over said shoulder and onto said portion, a flange guiding portion on said spindle adjacent said shoulder, an operating section for turning said spindle relative to said collar to move the periphery of said shoulder out of registry with said portion and simultaneously to move said shoulder into engagement with the inner face of the reel flange to accurately position said inner face axially relative to said spindle and to cooperate with said surface to clamp said flange, means for limiting the turning movement of said spindle, and means for retaining said spindle in position with said shoulder and portion out of registry.

18. In a device of the class described, the combination with a support, of a cylindrical film-reel spindle rotatably mounted on said support, a radially projecting shoulder formed on said spindle intermediate the ends thereof, said shoulder having a square periphery, a tapering guiding portion extending from said square periphery to said cylindrical spindle, a radially projecting plate secured to an end of said spindle and spaced axially from said shoulder, a drive pulley journaled on said spindle intermediate said plate and shoulder, a radial surface on said pulley facing said shoulder, a square reel supporting portion projecting axially from said surface and positioned between the latter and said shoulder, said spindle being rotatable relative to said pulley to bring the periphery of said shoulder into registry with said portion so that a film reel may be slid onto said spindle and over said guiding portion so that a square aperture in a flange of the reel may be positioned over said portion to support the reel thereon and with the outer face of the reel flange in contact with said surface, a plurality of spring-pressed pins carried by said pulley and engaging said plate to move said pulley yieldably toward said shoulder to maintain said surface in contact with the outer face of said flange, said plate being formed with elongated slots through which said pins extend, said plates also having recesses at the bottoms of said slots adjacent the ends thereof to receive the ends of the pins to connect the pulley to the spindle so that the latter will rotate as a unit with said pulley, and a gripping section on said spindle for rotating the latter relative to said pulley to shift the periphery of said shoulder out of registry with said supporting portion to lock said flange between said surface and said shoulder and to bring the latter into engagement with the inner face of said flange to accurately position the latter axially of said spindle and square with the axis thereof, said pin and slots permitting relative rotation of the pulley and spindle and when the spindle has been rotated to bring the shoulder periphery and the portion to registry or nonregistry relation the pins engage the ends of the slots to limit further rotation of the spindle to position the parts, and when so positioned the pins engage in registering recesses to maintain the adjustment of the parts.

19. In a device of the class described, the combination with a support, of a film-reel spindle rotatably mounted on said support, a pair of radially extending abutments carried by said spindle, one of said abutments being axially fixed on but rotatable relative to said support and adapted to engage a face of a film reel flange to position the latter axially relative to said support, said other abutment being adjustable axially of said spindle and toward said fixed abutment to cooperate therewith to clamp said flange therebetween and in a square relation with the axis of the spindle, flange supporting means carried by said other abutment and adapted to register with said one abutment, means for moving said other abutment toward said fixed abutment, means for frictionally connecting said other abutment to said spindle, and means for moving said fixed abutment and said supporting means out of registering relation to clamp said flange to said spindle and between said abutments.

20. In a device of the class described, the combination with a support, of a film-reel spindle rotatably mounted relative to the support, a pair of parallel, radially extending abutments carried by said spindle, one of said abutments being axially fixed on but rotatable relative to said support and adapted to engage a face of a film-reel flange to position the latter accurately axially relative to said support, said other abutment being formed on a member loosely mounted on said spindle, means for moving said member yieldably toward said fixed abutment to bring the other abutment into contact with the other face of said flange to clamp said flange yieldably between said abutments and in a square relation with the axis of said spindle, a flange-supporting portion formed on said member adjacent said other abutment and adapted to be arranged in register with said fixed abutment so as to be positioned in an aperture in said flange, means for latching said member frictionally to said spindle for movement as a unit therewith, and means for rotating said spindle relative to said member to move said fixed abutment out of registry with said supporting portion to lock said flange on said spindle and in clamped relation between said radial abutments.

MILLER R. HUTCHISON, JR.

REFERENCES CITED

The following references are of record in the file of this patent:

UNITED STATES PATENTS

| Number | Name | Date |
|---|---|---|
| 1,724,034 | Mayer | Aug. 13, 1929 |
| 1,825,663 | Hayden | Oct. 6, 1931 |
| 2,146,835 | Merwin | Feb. 14, 1939 |